(12) United States Patent
An et al.

(10) Patent No.: US 12,280,680 B2
(45) Date of Patent: Apr. 22, 2025

(54) VEHICLE BODY STRUCTURE

(71) Applicants: Hyundai Motor Company, Seoul (KR); Kia Corporation, Seoul (KR)

(72) Inventors: Yong Dok An, Anyang-si (KR); Heedae Oh, Suwon-si (KR); Mun Soo Cha, Suwon-si (KR); Mok Yeon Hong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 386 days.

(21) Appl. No.: 17/955,043

(22) Filed: Sep. 28, 2022

(65) Prior Publication Data
US 2023/0406121 A1   Dec. 21, 2023

(30) Foreign Application Priority Data

Jun. 17, 2022   (KR) .................. 10-2022-0073987

(51) Int. Cl.
| | |
|---|---|
| *B60L 50/75* | (2019.01) |
| *B60K 1/00* | (2006.01) |
| *B60K 1/04* | (2019.01) |
| *B60K 11/06* | (2006.01) |
| *B60K 15/03* | (2006.01) |
| *B60L 50/60* | (2019.01) |
| *B60L 50/71* | (2019.01) |
| *B62D 25/08* | (2006.01) |
| *B62D 25/20* | (2006.01) |

(52) U.S. Cl.
CPC .............. *B60L 50/75* (2019.02); *B60K 1/00* (2013.01); *B60K 1/04* (2013.01); *B60K 11/06* (2013.01); *B60K 15/03006* (2013.01); *B60L 50/66* (2019.02); *B60L 50/71* (2019.02); *B62D 25/08* (2013.01); *B62D 25/20* (2013.01); *B60K 2001/0416* (2013.01); *B60K 2015/03315* (2013.01)

(58) Field of Classification Search
CPC .......... B60L 50/75; B60L 50/66; B60L 50/71; B60K 1/00; B60K 1/04; B60K 11/06; B60K 15/03006; B62D 25/08; B62D 25/20
See application file for complete search history.

(56) References Cited

U.S. PATENT DOCUMENTS

| | | | | |
|---|---|---|---|---|
| 7,358,003 | B2 * | 4/2008 | Imaseki | H01M 8/04074 |
| | | | | 429/435 |
| 7,874,391 | B2 * | 1/2011 | Dahl | B60K 11/04 |
| | | | | 280/783 |
| 8,511,237 | B2 * | 8/2013 | Morita | B60L 3/0046 |
| | | | | 105/51 |
| 11,491,862 | B2 * | 11/2022 | Nishiwaki | B60K 11/08 |
| 2013/0239913 | A1 * | 9/2013 | Young | F01P 3/18 |
| | | | | 123/41.49 |
| 2021/0221219 | A1 * | 7/2021 | Watanabe | B60K 11/085 |
| 2024/0200688 | A1 * | 6/2024 | El Chammas | F25B 5/02 |

* cited by examiner

*Primary Examiner* — John D Walters
(74) *Attorney, Agent, or Firm* — Slater Matsil, LLP

(57) ABSTRACT

An embodiment is a vehicle body structure including a front body comprising a first cooling module, a middle body having a center floor panel, the center floor panel being connected to the front body, and a rear body comprising a second cooling module and a third cooling module, the second cooling module being on each of two sides of a rear portion of the rear body in a vehicle width direction, the rear body being connected to the middle body, the third cooling module being in the rear portion of the rear body.

20 Claims, 10 Drawing Sheets

VEHICLE BODY STRUCTURE

CROSS-REFERENCE TO RELATED APPLICATIONS

This application claims priority to and the benefit of Korean Patent Application No. 10-2022-0073987, filed in the Korean Intellectual Property Office on Jun. 17, 2022, the entire contents of which are incorporated herein by reference.

TECHNICAL FIELD

The present invention relates to a vehicle body structure.

BACKGROUND

In general, an eco-friendly vehicle may include, for example, a hybrid vehicle, an electric vehicle, a hybrid electric vehicle and a hydrogen-powered vehicle (usually referred to as a 'hydrogen electric vehicle' by those skilled in the art).

Among these vehicles, in case of the hydrogen-powered vehicle, various parts such as a high-voltage battery, a fuel cell stack, a driving motor, a hydrogen tank and a cooling module may be mounted on a vehicle body thereof. In recent years, a hydrogen electric vehicle-based (e.g., sedan-type, coupe-type or sports car-type) passenger vehicle has been introduced.

However, for the hydrogen electric vehicle-based passenger vehicle, it may be difficult to mount the various parts in a limited space of the vehicle body, and have damage to the various parts in an event of a collision of the vehicle.

The above information disclosed in this background section is provided only to assist in better understanding of the background of the present invention, and may thus include information not included in the prior art already known to those skilled in the art to which the present invention pertains.

SUMMARY

The present invention relates to a vehicle body structure, and more particularly, to a vehicle body structure of a hydrogen electric vehicle for passenger use.

Embodiments of the present invention provide a vehicle body structure which may secure a space for arranging various parts in a vehicle body of a hydrogen electric vehicle-based passenger vehicle, and secure mounting rigidity of the various parts and rigidity of the vehicle body.

According to an embodiment of the present invention, a vehicle body structure includes i) a front body in which at least one first cooling module is disposed, ii) a middle body which includes a center floor panel connected to the front body, and iii) a rear body in which a second cooling module is disposed on each of two sides of a rear portion of the rear body, connected to the middle body, in a vehicle width direction, and at least one third cooling module is disposed in the rear portion of the rear body.

In addition, the front body may include a front side member disposed on each of two sides of the front body in the vehicle width direction, and disposed in a vehicle body front-rear direction.

In addition, the at least one first cooling module may be disposed on a front portion of the front side member.

In addition, a fuel cell stack may be disposed between both the front side members.

In addition, the middle body may include a middle side member disposed on each of two sides of the middle body in the vehicle width direction, and disposed in a vehicle front-rear direction.

In addition, the center floor panel may be coupled to the middle side member.

In addition, a tunnel portion may be disposed on the center floor panel in the vehicle front-rear direction.

In addition, the rear body may include a rear side member disposed on each of two sides of the rear body in the vehicle width direction, and disposed in a vehicle front-rear direction, and a dome-shaped rear floor structure coupled to a front portion of the rear side member and connected to the center floor panel.

In addition, the rear body may further include a rear cross member coupled to the rear side member at the rear of the rear floor structure in the vehicle width direction.

In addition, a partition panel may be coupled to an upper portion of the rear floor structure to partition the middle body and the rear body from each other.

In addition, a high-voltage battery may be disposed under the rear floor structure and under the tunnel portion disposed on the center floor panel in the vehicle front-rear direction.

In addition, the battery may have a 'T' shape and disposed under the rear floor structure and the tunnel portion.

In addition, the second cooling module may be disposed on each of two sides of the rear floor structure in the vehicle width direction.

In addition, the partition panel may include a bent portion bent toward the middle body from each of two sides of the rear body in the vehicle width direction.

In addition, an air flow passage may be disposed between the bent portion and a side structure disposed on each of two sides of the rear body in the vehicle width direction.

In addition, the second cooling module may be disposed in the air flow passage.

In addition, air inlet holes connected to the air flow passage may respectively be disposed in the first rear side panel and second rear side panel of the side structure.

In addition, the at least one third cooling module may be disposed below the rear side member at the rear of the rear floor structure.

In addition, at least one hydrogen tank may be disposed between the partition panel and the rear cross member.

In addition, a driving motor and an inverter may be disposed below the at least one hydrogen tank.

In addition, a hydrogen charging port may be disposed in a first rear side panel of a side structure disposed on each of two sides of the rear body in the vehicle width direction.

In addition, an electric charging port may be disposed in a second rear side panel of the side structure.

In addition, the rear body may further include a part mounting unit coupled to the rear floor structure and the partition panel to dispose at least one hydrogen tank and the second cooling module in the rear body.

In addition, the part mounting unit may include a lower mounting cross member coupled to the upper portion of the rear floor structure in the vehicle width direction and a lower portion of the partition panel and an upper mounting cross member coupled to an upper portion of the partition panel in the vehicle width direction.

In addition, a hydrogen inlet/outlet assembly may be disposed on a side portion of the at least one hydrogen tank.

In accordance with the embodiments of the present invention, it is possible to provide the hydrogen electric vehicle-based passenger vehicle in which the various parts are arranged in the limited space of the entire vehicle body without increasing the height of the vehicle body.

In accordance with the embodiments of the present invention, it is also possible to secure the mounting rigidity of the various parts while strengthening the connectivity of the various parts in the vehicle body, and secure the structural rigidity of the vehicle body.

Another effect which may be obtained or predicted by an embodiment of the present invention is disclosed directly or implicitly in the detailed description of an embodiment of the present invention. That is, various effects predicted by an embodiment of the present invention are disclosed in the detailed description described below.

BRIEF DESCRIPTION OF THE DRAWINGS

Embodiments in the specification may be better understood by reference to the following description in connection with the accompanying drawings in which like reference numerals refer to identical or functionally similar elements.

It should be understood that the drawings referenced above are not necessarily drawn to scale, and present a rather simplified representation of various preferred features illustrating basic principles of the present invention. For example, specific design features of the present invention, including a specific dimension, orientation, position and shape, are determined in part by the particular intended application and environment of use.

DETAILED DESCRIPTION OF ILLUSTRATIVE EMBODIMENTS

Terms in this specification are used to describe specific embodiments, and are not intended to limit the present invention. Terms of a singular form used herein are intended to include plural forms unless the context clearly indicates otherwise. It is to be understood that terms "comprise," or "include" used in this specification specify the presence of features, numerals, steps, operations, elements and/or components, and do not preclude the presence or addition of one or more other features, numerals, steps, operations, components and/or groups thereof. The term "and/or" used herein includes any one or all combinations of one or more associated listed items. A term "coupled" used herein indicates a physical relationship between two components directly connected to each other by welding, self-piercing rivet (SPR), flow drill screw (FDS), structural adhesive or the like, or indirectly connected to each other through one or more medium components.

"Vehicle," "of a vehicle," "automobile" or other similar terms used herein generally refer to a passenger vehicle including a sports car, a sport utility vehicle (SUV), a bus, a truck and a passenger automobile including various commercial vehicles, and also refer to a hybrid vehicle, an electric vehicle, a hybrid electric vehicle, a hydrogen-powered vehicle, a purpose-based mobility vehicle (or purpose built vehicle, PBV), and a vehicle using another alternative fuel (e.g., fuel derived from a resource other than petroleum).

Hereinafter, embodiments of the present invention are described in detail with reference to the accompanying drawings.

Figure 1:
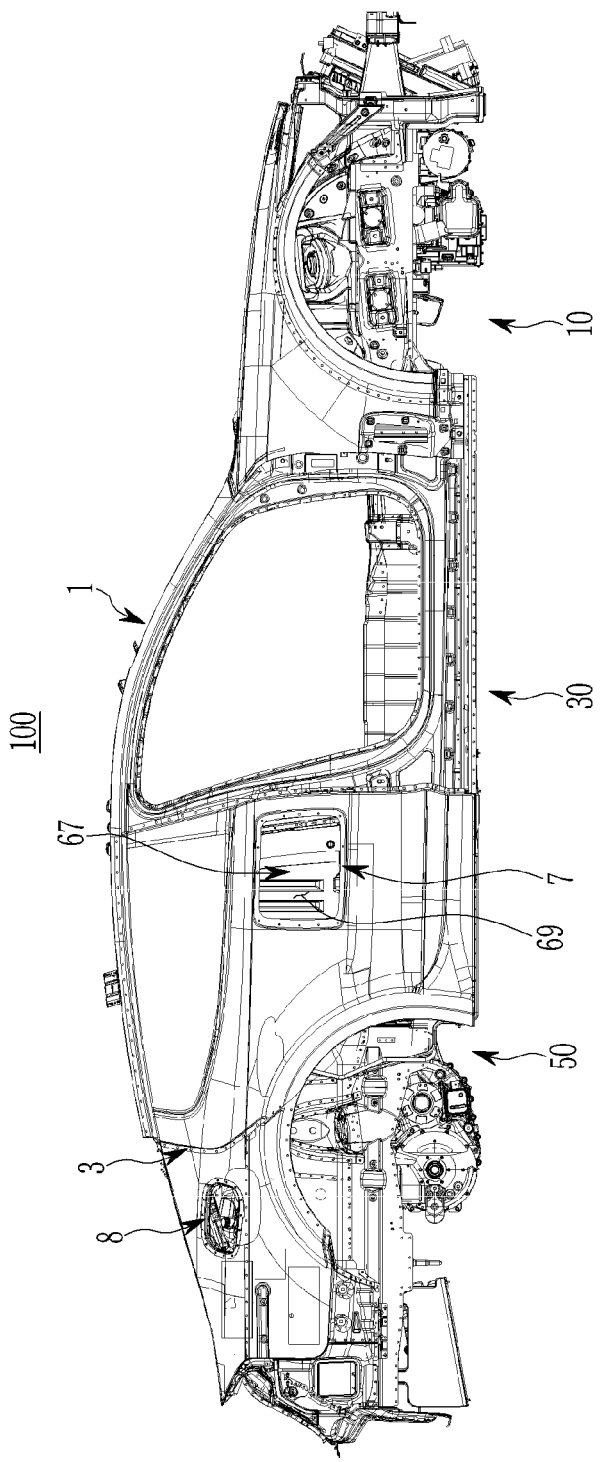
FIGS. 1 and 2 are side views of a vehicle body structure according to an embodiment of the present invention.
Figure 2:
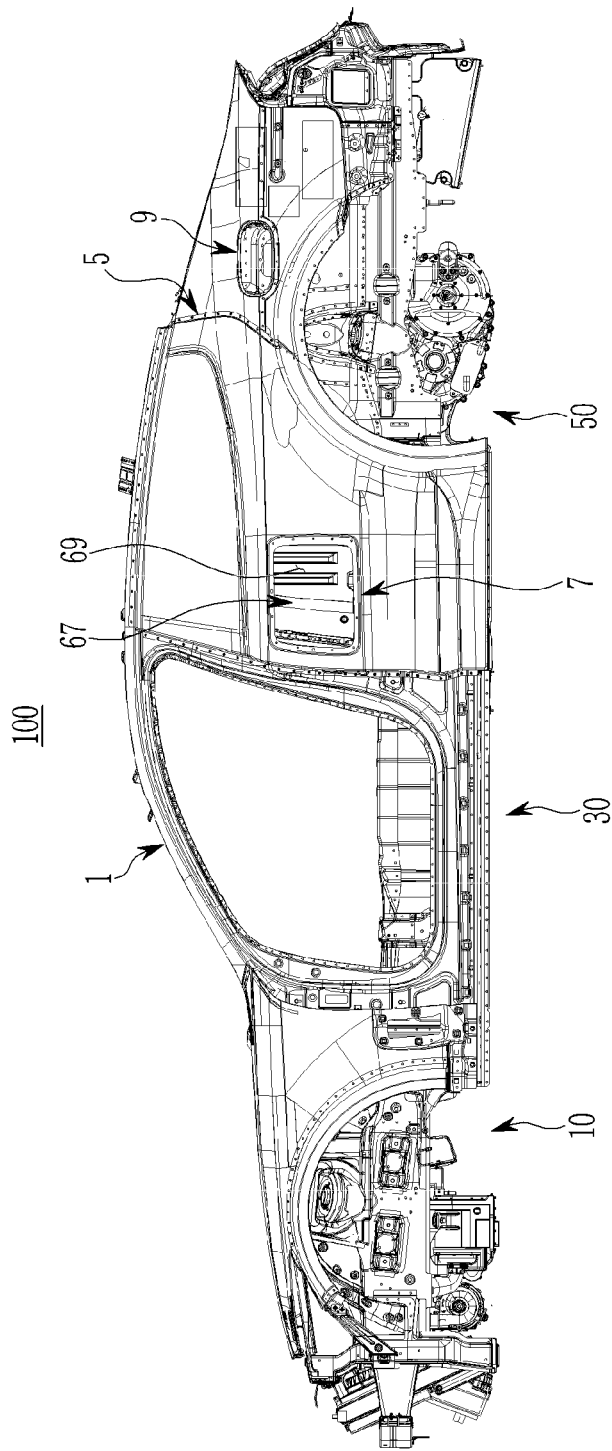

FIGS. 1 and 2 are side views of a vehicle body structure according to an embodiment of the present invention.

Referring to FIGS. 1 and 2, a vehicle body structure 100 according to an embodiment of the present invention may be applied to a vehicle body of an electric vehicle, furthermore, a vehicle body of a hydrogen electric vehicle-based (e.g., sedan-type, coupe-type or sports car-type) passenger vehicle.

Various parts such as a high-voltage battery, a fuel cell stack, a driving motor, an inverter, at least one hydrogen tank and a cooling module may be arranged in the vehicle body of the hydrogen electric vehicle-based passenger vehicle.

The vehicle body structure 100 according to an embodiment of the present invention may be mounted with the various parts as described above in the vehicle body of the hydrogen electric vehicle-based passenger vehicle.

In this specification, a 'vehicle front-rear direction' may be defined as the length direction of the vehicle body, a 'vehicle width direction' may be defined as the left and right direction of the vehicle body, and a 'vertical direction' may be defined as the height direction of the vehicle body.

Further, in this specification, the 'upper end portion', 'upper portion', 'upper end' or 'upper surface' of a component may indicate the end portion, portion, end or surface of a component disposed on a relatively upper side in the drawings, and the 'lower end portion', 'lower portion', 'lower end' or 'lower surface' of a component may indicate the end portion, portion, end or surface of a component disposed on a relatively lower side in the drawings.

Furthermore, in this specification, an end (e.g., one end or another/the other end) of a component may indicate an end of the component in any one direction, and an end portion (e.g., one end portion or another/the other end portion) of a component may indicate a certain portion of the component including its end.

The vehicle body structure 100 according to an embodiment of the present invention may secure a space for arranging the various parts in the vehicle body of the hydrogen electric vehicle-based passenger vehicle, and secure mounting rigidity of the various parts and rigidity of the vehicle body.

To this end, the vehicle body structure 100 according to an embodiment of the present invention may basically include a front body 10, a middle body 30 and a rear body 50.

Figure 3:
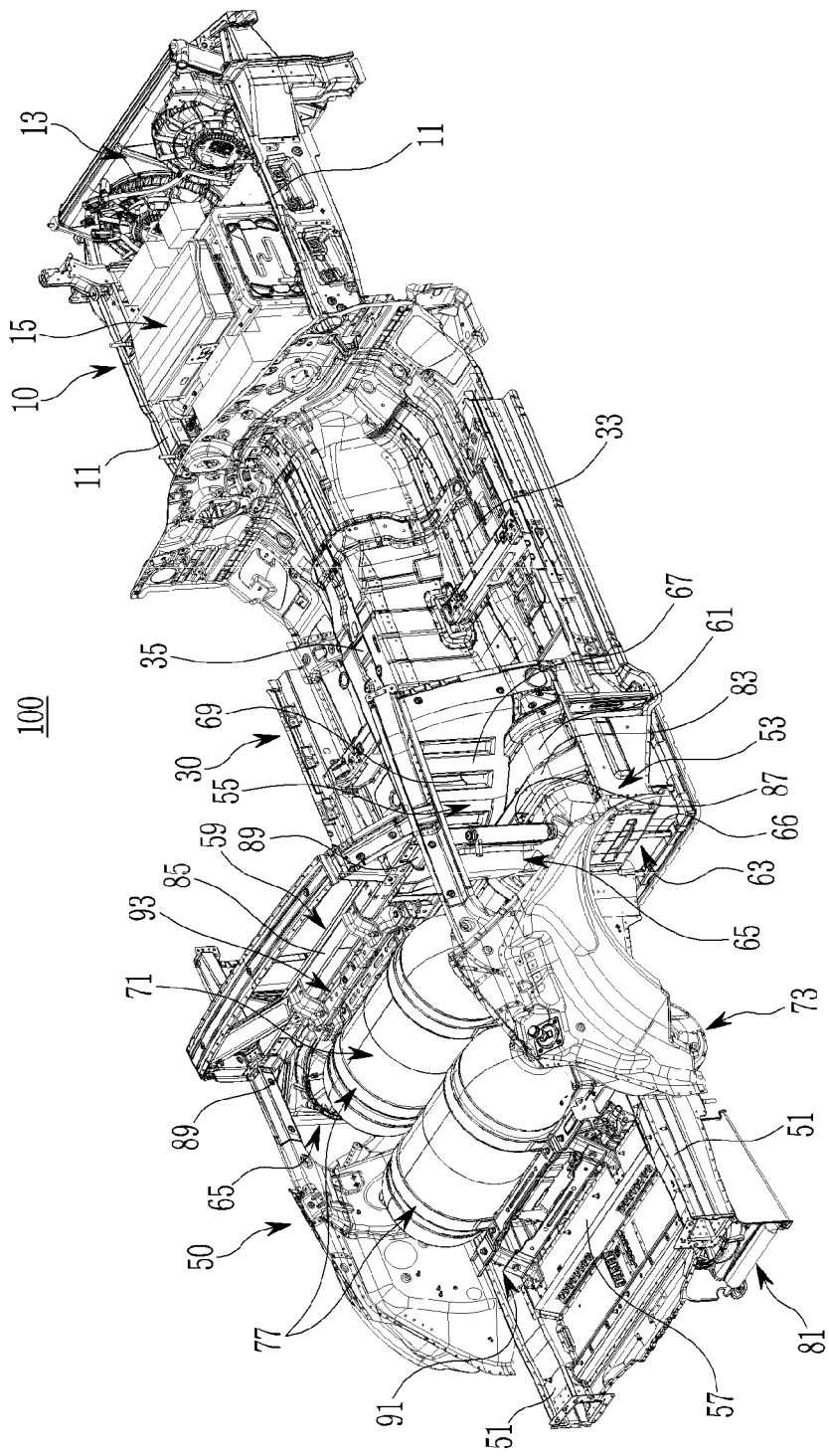
FIG. 3 is a perspective view of the vehicle body structure according to an embodiment of the present invention.
Figure 4:
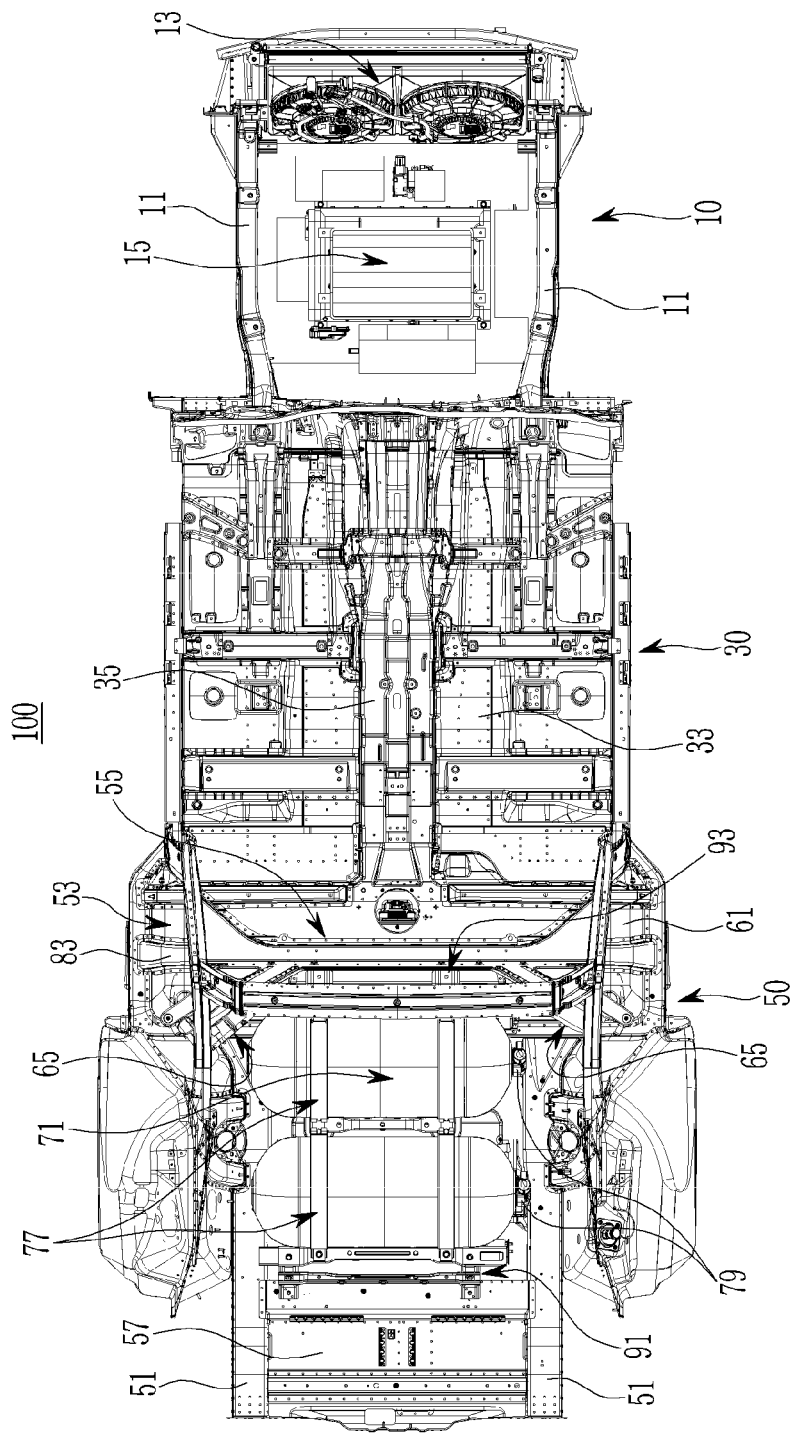
FIG. 4 is a plan view of the vehicle body structure according to an embodiment of the present invention.
Figure 5:
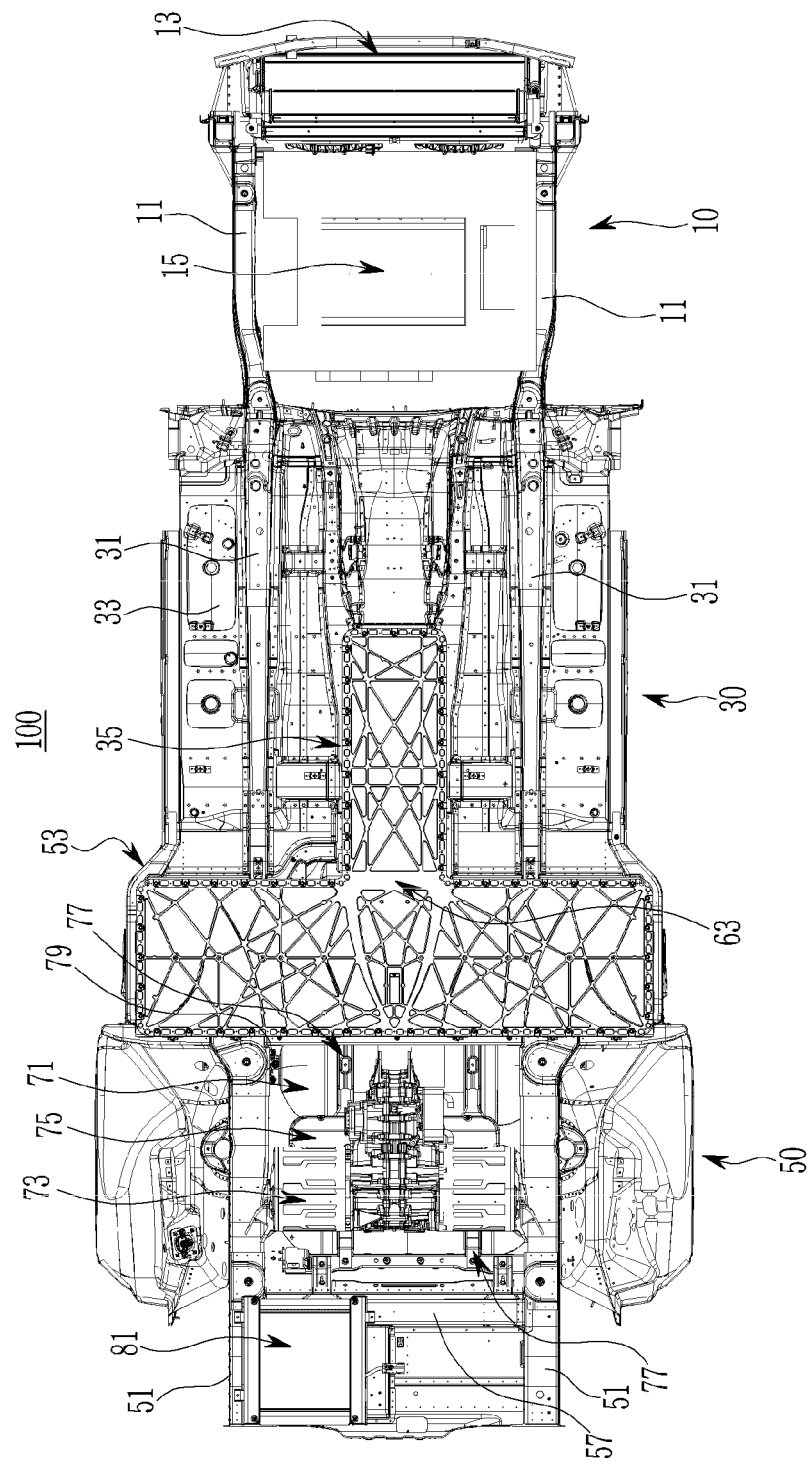
FIG. 5 is a bottom view of the vehicle body structure according to an embodiment of the present invention.

FIG. 3 is a perspective view of the vehicle body structure according to an embodiment of the present invention; FIG. 4 is a plan view of the vehicle body structure according to an embodiment of the present invention; and FIG. 5 is a bottom view of the vehicle body structure according to an embodiment of the present invention.

Referring to FIGS. 1 to 5, the front body 10 in an embodiment of the present invention may include a front side member 11. The front side member 11 may be disposed on each of two sides of the front body 10 in the vehicle width direction, and disposed in the vehicle body front-rear direction.

Here, at least one first cooling module 13 may be disposed on a front portion of the front side member 11. In addition, a fuel cell stack 15 may be disposed on a rear portion of the front side member 11. Furthermore, the fuel cell stack 15 may be disposed between both the front side members 11.

The at least one first cooling module 13 may cool the fuel cell stack 15. The first cooling module 13 may include a radiator and a cooling fan which are known to those skilled in the art. The fuel cell stack 15 may be disposed in a space provided between both the front side members 11 at the rear of the at least one first cooling module 13.

The at least one first cooling module 13 and the fuel cell stack 15 may be mounted on the front side member 11 by using a mounting bracket known to those skilled in the art.

In an embodiment of the present invention, the middle body 30 may be a passenger compartment of the hydrogen electric vehicle-based passenger vehicle. The middle body 30 may include a middle side member 31 and a center floor panel 33.

The middle side member 31 may be disposed on each of two sides of the middle body 30 in the vehicle width direction, and disposed in the vehicle front-rear direction. The middle side member 31 may be connected to the front side member 11 of the front body 10 in the vehicle front-rear direction.

The center floor panel 33 may be connected to the front body 10 in the front thereof in the vehicle front-rear direction, and connected to the rear body 50 at the rear thereof in the vehicle front-rear direction. The center floor panel 33 may be coupled to the middle side member 31.

The center floor panel 33 may include a tunnel portion 35. The tunnel portion 35 may be disposed on an upper portion of the center floor panel 33 in the vehicle front-rear direction. The tunnel portion 35 may extend upward from an upper surface of the center floor panel 33. That is, the center floor panel 33 may include a tunnel space in its lower portion made by the tunnel portion 35.

Referring to FIGS. 1 to 5, the rear body 50 in an embodiment of the present invention may be connected to a rear portion of the middle body 30 in the vehicle front-rear direction.

Figure 6:
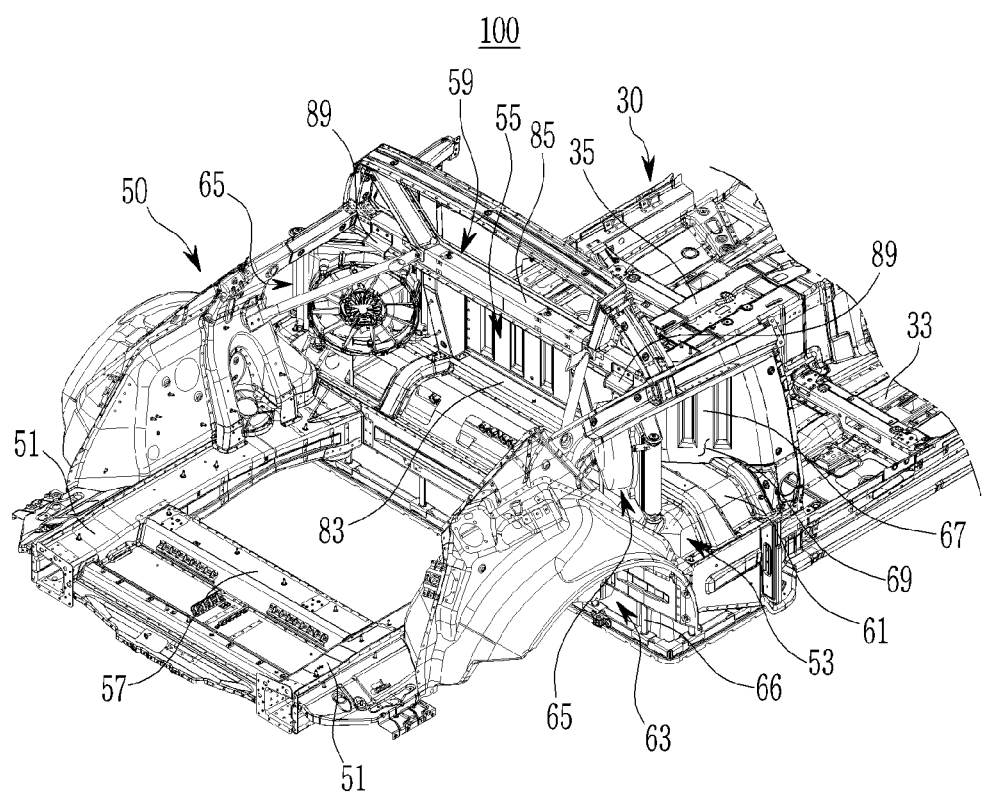
FIGS. 6 to 8 are perspective views of a rear body applied to the vehicle body structure according to an embodiment of the present invention.
Figure 7:
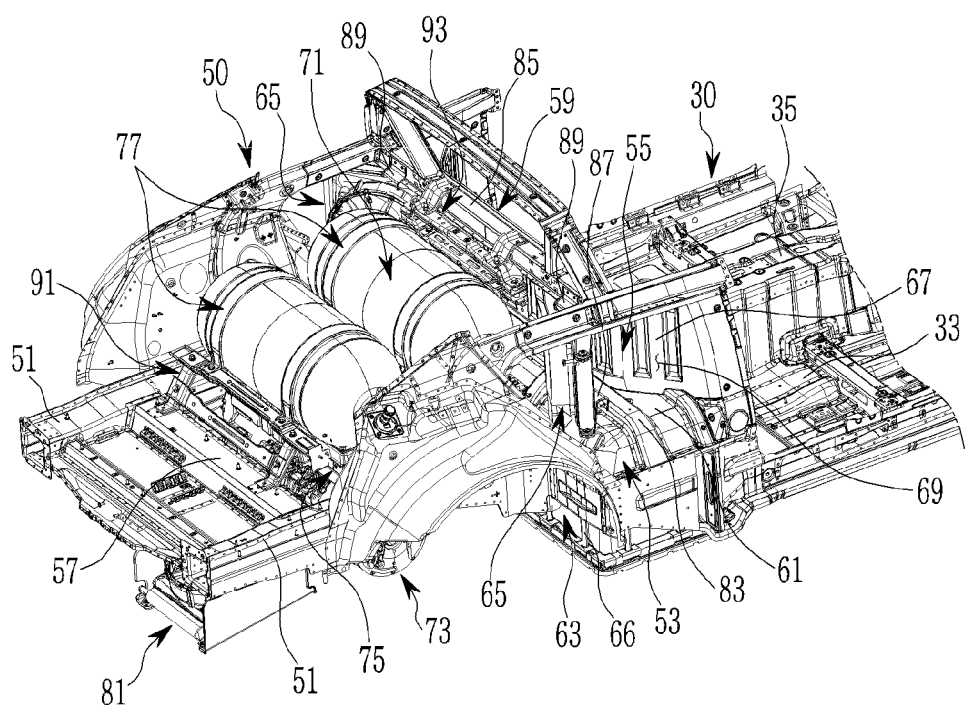
Figure 8:
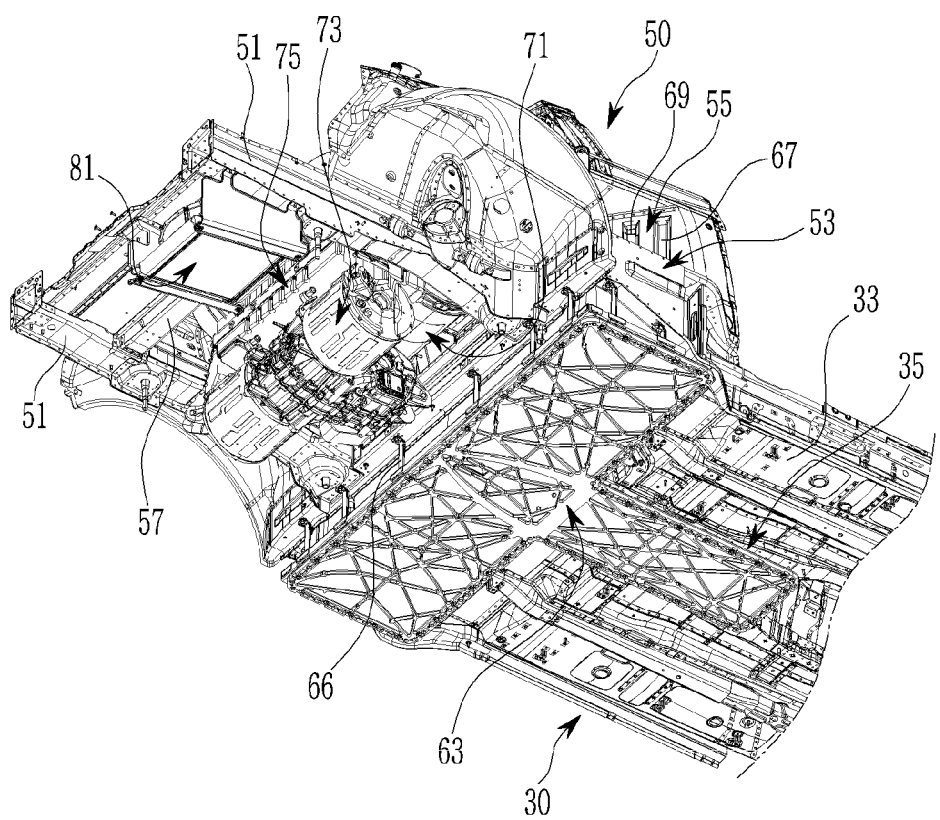

FIGS. 6 to 8 are perspective views of a rear body applied to the vehicle body structure according to an embodiment of the present invention.

Referring to FIGS. 1 to 8, the rear body 50 according to an embodiment of the present invention may include a rear side member 51, a rear floor structure 53, a partition panel 55, and a rear cross member 57 and a part mounting unit 59.

In an embodiment of the present invention, the rear side member 51 may be disposed on each of two sides of the rear body 50 in the vehicle width direction, and disposed in the vehicle front-rear direction. The rear side member 51 may be connected to the middle side member 31 of the middle body 30 in the vehicle front-rear direction.

In an embodiment of the present invention, the rear floor structure 53 may be disposed in the rear body 50 in the vehicle width direction and coupled to a front portion of the rear side member 51. The rear floor structure 53 may be coupled to a rear portion of the center floor panel 33 of the middle body 30.

Here, the rear floor structure 53 may include a rear floor panel 61 connected to the center floor panel 33 of a middle body 30. In one example, the rear floor panel 61 may have a shape of a dome extending upward from a lower surface of the rear floor structure 53. That is, the rear floor panel 61 may include a floor space formed at its lower portion by the dome shape.

Further, as shown in FIG. 8, a high-voltage battery 63 may be disposed under the rear floor panel 61 of the rear floor structure 53 and under the tunnel portion 35 of the center floor panel 33. The battery 63 may be a battery assembly which may be charged and discharged.

The battery 63 may be disposed in the floor space of the rear floor panel 61 and the tunnel space of the tunnel portion 35. In one example, the battery 63 may have a 'T' shape and be disposed under the rear floor panel 61 and the tunnel portion 35.

Here, the rear floor panel 61 and the tunnel portion 35 may surround the battery 63, and stably support the battery 63. In addition, a lower edge portion of the rear floor panel 61 and a lower edge portion of the tunnel portion 35 may be fastened to a lower edge portion of the battery 63 by using a plurality of mounting bolts 66.

Meanwhile, a second cooling module 65 may be disposed on each of two sides of the rear floor structure 53 in the vehicle width direction. The second cooling module 65 may be disposed on each of two sides of a rear portion of the rear body 50, connected to the middle body 30, in the vehicle width direction. The second cooling module 65 may cool the battery 63.

The second cooling module 65 may be disposed between each of the two sides of the rear floor structure 53 and a side structure 1 disposed on each of two sides of the rear body 50 in the vehicle width direction. The second cooling module 65 may be disposed in each space provided between each of the two sides of the rear floor structure 53 and the first rear side panel 3 and second rear side panel 5 of the side structure 1.

Here, the second cooling module 65 may be disposed on each of the two sides of the rear floor structure 53, and thus be referred to as a side cooling module. The second cooling module 65 may include the radiator and the cooling fan which are known to those skilled in the art. A mounting structure of the rear body 50 for the second cooling module 65 is described in detail below.

In an embodiment of the present invention, the partition panel 55 may partition the middle body 30 and the rear body 50 from each other in the vehicle front-rear direction. The partition panel 55 may be disposed on a boundary point between the middle body 30 and the rear body 50 in the vehicle width direction. In addition, the partition panel 55 may be coupled to an upper portion of the rear floor structure 53 in the vertical direction.

The partition panel 55 may include a bent portion 67 bent toward the middle body 30 from each of the two sides of the rear body 50 in the vehicle width direction. An air flow passage 69 may be disposed between the bent portion 67 and the first rear side panel 3 or second rear side panel 5 of the side structure 1.

The second cooling module 65 may be disposed in the air flow passage 69. In addition, air inlet holes 7 connected to the air flow passage 69 may respectively be disposed in the first rear side panel 3 and the second rear side panel 5 (see FIGS. 1 and 2). Accordingly, when the second cooling module 65 is operated, external air may be introduced into the second cooling module 65 while flowing along the air flow passage 69 through the air inlet hole 7.

In an embodiment of the present invention, the rear cross member 57 may be coupled to the rear side member 51 at the rear of the partition panel 55 in the vehicle width direction.

Meanwhile, at least one hydrogen tank 71 may be disposed between the partition panel 55 and the rear cross member 57. In one example, the at least one hydrogen tank 71 may include a pair of hydrogen tanks. In addition, a driving motor 73 and an inverter 75 may be disposed below the at least one hydrogen tank 71.

The at least one hydrogen tank 71 may be disposed in a space provided between the upper portion of the rear floor structure 53 and an upper portion of the rear cross member 57. In addition, the driving motor 73 and the inverter 75 may be disposed in a space provided by the rear side member 51 below the at least one hydrogen tank 71.

Here, the at least one hydrogen tank 71 may be supported by the partition panel 55 and the rear cross member 57 by using the mounting bracket or the like, known to those skilled in the art. The mounting structure of the rear body 50 for the at least one hydrogen tank 71 is described in detail below. In addition, the driving motor 73 and the inverter 75 may be mounted on the rear side member 51 by using the mounting bracket or the like, known to those skilled in the art.

Figure 9:
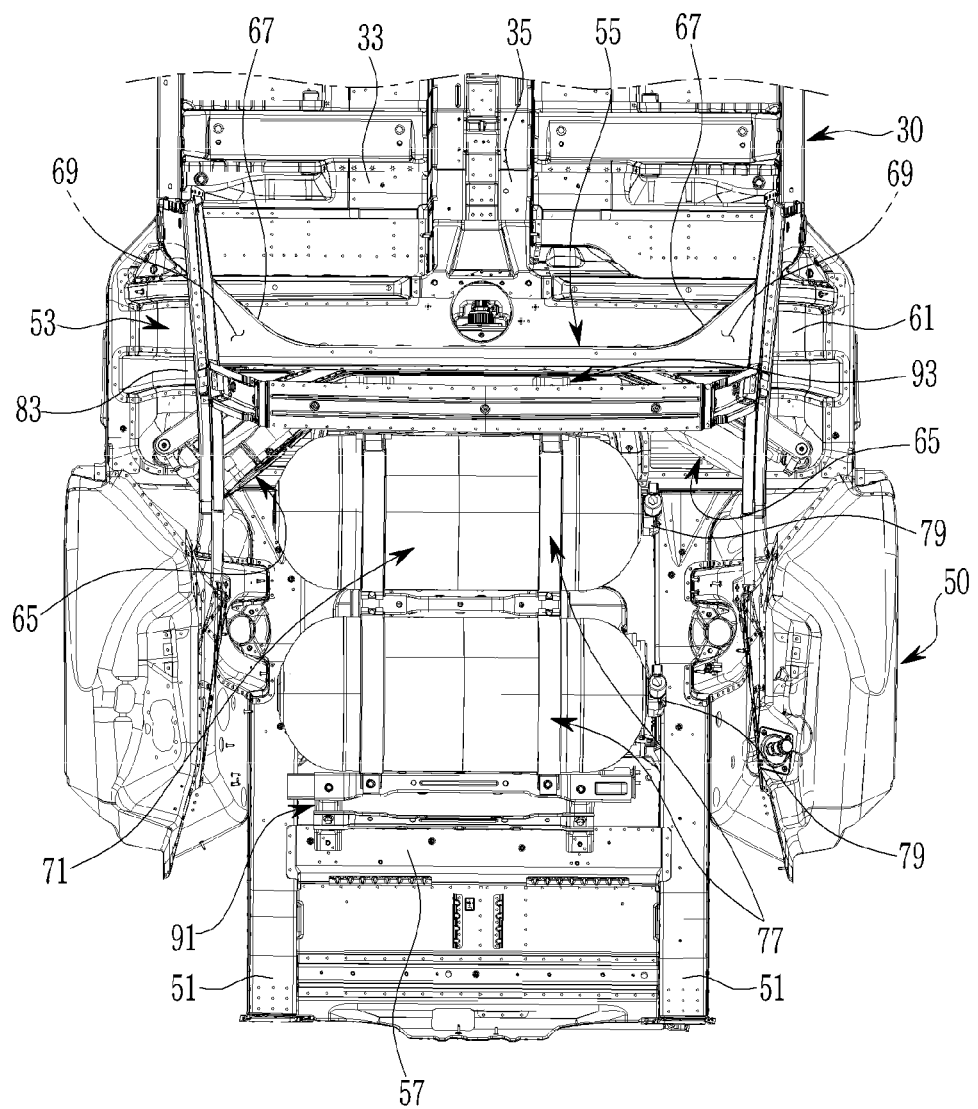
FIG. 9 is a view of a hydrogen tank-mounting structure of the rear body applied to the vehicle body structure according to an embodiment of the present invention.

Furthermore, the at least one hydrogen tank 71 may be coupled to at least one tank support member 77 as shown in FIG. 9. The at least one tank support member 77 may include a band assembly known to those skilled in the art.

In addition, the at least one hydrogen tank 71 may include a hydrogen inlet/outlet assembly 79 disposed on one side (e.g., side portion) thereof. Accordingly, a hydrogen charging port 8 may be disposed in the first rear side panel 3 of the side structure 1, corresponding to the hydrogen inlet/outlet assembly 79 (see FIG. 1). A hydrogen charging inlet (not shown) connected to the hydrogen inlet/outlet assembly 79 may be installed on the hydrogen charging port 8.

Furthermore, an electric charging port 9 may be disposed in the second rear side panel 5 of the side structure 1, corresponding to the other side of the at least one hydrogen tank 71 (see FIG. 2). An electric charging inlet (not shown) connected to the battery 63 may be installed in the electric charging port 9.

Meanwhile, at least one third cooling module 81 may be disposed in the rear portion of the rear body 50 as shown in FIGS. 3, 5 and 8. The at least one third cooling module 81 may be disposed below the rear side member 51 at the rear of the rear floor structure 53.

The at least one third cooling module 81 may cool the driving motor 73 and the inverter 75. The at least one third cooling module 81 may include the radiator and the cooling fan which are known to those skilled in the art. The at least one third cooling module 81 may be disposed in a space provided by the rear side member 51 and the rear cross member 57.

The at least one third cooling module 81 may be mounted below the rear side member 51 and below the rear cross member 57 by using the mounting bracket or the like, known to those skilled in the art.

Referring to FIGS. 6 and 7, the part mounting unit 59 according to an embodiment of the present invention may dispose (e.g., mount) the second cooling module 65 and the at least one hydrogen tank 71 in the rear body 50.

The part mounting unit 59 may be coupled to the rear floor structure 53 and the partition panel 55. The part mounting unit 59 may include a lower mounting cross member 83 and an upper mounting cross member 85.

The lower mounting cross member 83 may support the second cooling module 65 and the at least one hydrogen tank 71 while reinforcing the upper portion of the rear floor structure 53. The lower mounting cross member 83 may be coupled to the upper portion of the rear floor structure 53 in the vehicle width direction.

The lower mounting cross member 83 may be coupled to an upper surface of the rear floor panel 61. In one example, a closed section having a rectangular cross section may be disposed between the lower mounting cross member 83 and the upper surface of the rear floor panel 61.

In addition, the upper mounting cross member 85 may support the second cooling module 65 and the at least one hydrogen tank 71 while reinforcing an upper portion of the partition panel 55. The upper mounting cross member 85 may be coupled to the upper portion of the partition panel 55 in the vehicle width direction.

Each of two end portions of the upper mounting cross member 85 may be coupled to the side structure 1. In addition, the upper mounting cross member 85 may be coupled to an upper surface of the partition panel 55. In one example, a closed section having a rectangular cross section may be disposed between the upper mounting cross member 85 and the upper surface of the partition panel 55.

Figure 10:
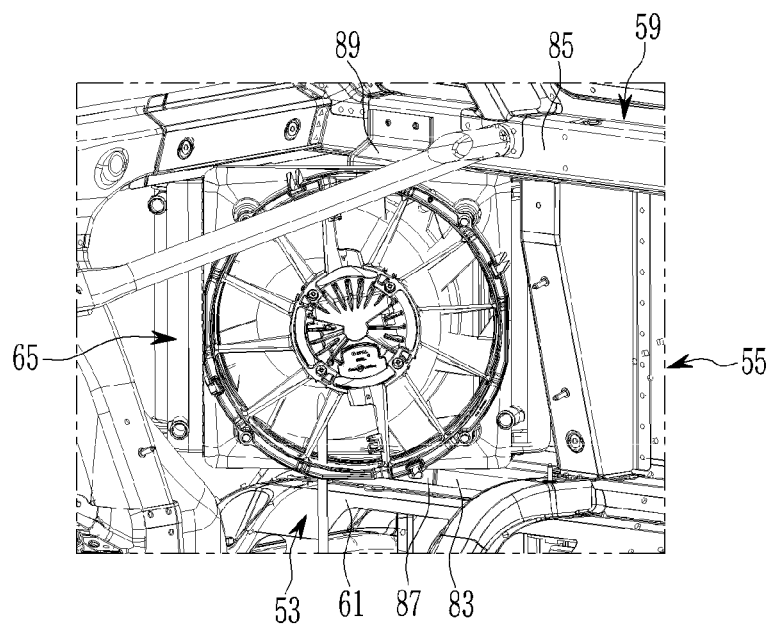
FIG. 10 is a view of a second cooling module-mounting structure of the rear body applied to the vehicle body structure according to an embodiment of the present invention.

When describing an example in which the second cooling module 65 is mounted in the rear body 50 by using the part mounting unit 59 configured as described above, a lower portion of the second cooling module 65 may be fixed to the lower mounting cross member 83 by using at least one first lower mounting member 87, as shown in FIG. 10. In addition, an upper portion of the second cooling module 65 may be fixed to the upper mounting cross member 85 by using at least one first upper mounting member 89.

When describing an example in which the at least one hydrogen tank 71 is mounted in the rear body 50 by using the part mounting unit 59 configured as described above, the at least one hydrogen tank 71 may be fixed to the rear cross member 57 by using at least one second lower mounting member 91, as shown in FIGS. 7 and 9. In addition, the at least one hydrogen tank 71 may be fixed to the upper mounting cross member 85 by using the at least one second upper mounting member 93.

The at least one second lower mounting member 91 and the at least one second upper mounting member 93 may be coupled to the above-mentioned at least one tank support member 77.

Hereinafter, the description describes an operation of the vehicle body structure 100 configured as described above according to an embodiment of the present invention in detail with reference to FIGS. 1 to 10.

According to the vehicle body structure 100 according to an embodiment of the present invention, the at least one first cooling module 13 may be disposed in a space provided in a front portion of the front body 10. The second cooling module 65 may be disposed in a space provided in each of the two sides of a front portion of the rear body 50. In addition, the at least one third cooling module 81 may be disposed in a space provided in the rear portion of the rear body 50.

Further, according to the vehicle body structure 100 according to an embodiment of the present invention, the fuel cell stack 15 may be disposed in a space provided in a rear portion of the front body 10. The battery 63 may be disposed in a space provided under the rear body 50 and the middle body 30. The at least one hydrogen tank 71 may be disposed in a space provided in the front portion of the rear body 50. In addition, the driving motor 73 and the inverter 75 may be disposed in a space provided below the at least one hydrogen tank 71 in the front portion of the rear body 50.

As a result, the vehicle body structure 100 according to an embodiment of the present invention may provide the hydrogen electric vehicle-based passenger vehicle, such as a sports car, in which the parts as described above are arranged in a limited space of the entire vehicle body without increasing a height of the vehicle body.

In addition, the vehicle body structure 100 according to an embodiment of the present invention may further improve cooling performances of the fuel cell stack 15, the battery 63, the driving motor 73 and the inverter 75 by using the at least one first cooling module 13, the second cooling module 65 and the at least one third cooling module 81.

Meanwhile, the partition panel 55 partitioning the middle body 30 and the rear body 50 may be mounted in the vehicle body structure 100 according to an embodiment of the present invention.

Therefore, the vehicle body structure 100 according to an embodiment of the present invention may secure the rigidity of the vehicle body, and may prevent hydrogen gas from being introduced into the passenger compartment by shielding the passenger compartment of the middle body 30 and the hydrogen tank-mounting space in the rear body 50.

In addition, in the vehicle body structure 100 according to an embodiment of the present invention, the battery 63 may have the 'T' shape and be disposed in the space provided under the rear floor structure 53 and under the tunnel portion 35. Accordingly, the vehicle body structure 100 according to an embodiment of the present invention may lower a seating surface of a seat in the passenger compartment, and maintain a low height of the vehicle body.

In addition, the vehicle body structure 100 according to an embodiment of the present invention may increase safety of the battery 63 in an event of a collision of the vehicle by including the rear floor structure 53 and the tunnel portion 35 surrounding and supporting the battery 63.

Meanwhile, in the vehicle body structure 100 according to an embodiment of the present invention, the hydrogen charging port 8 may be disposed in the first rear side panel 3 of the side structure 1, corresponding to the hydrogen inlet/outlet assembly 79 disposed on one side of the at least one hydrogen tank 71. In addition, in the vehicle body structure 100 according to an embodiment of the present invention, the electric charging port 9 may be disposed in the second rear side panel 5 of the side structure 1, corresponding to the other side of the at least one hydrogen tank 71.

Therefore, the vehicle body structure 100 according to an embodiment of the present invention may increase safety of the at least one hydrogen tank 71 in an event of a rear collision of the vehicle, and lower risk of ignition of the hydrogen gas by including the hydrogen charging port 8 and the electric charging port 9 separated from each other in the vehicle width direction.

Furthermore, in the vehicle body structure 100 according to an embodiment of the present invention, the air flow passage 69 connected to the air inlet holes 7 of the first rear side panel 3 and the second rear side panel 5 may each be formed by the bent portion 67 of the partition panel 55, and the second cooling module 65 may be disposed in the air flow passage 69.

Accordingly, the vehicle body structure 100 according to an embodiment of the present invention may improve cooling performance of the vehicle, and also discharge the hydrogen gas leaked from the at least one hydrogen tank 71 to the rear of the passenger compartment through the air flow passage 69.

Meanwhile, in the vehicle body structure 100 according to an embodiment of the present invention, the part mounting unit 59 mounting the second cooling module 65 and the at least one hydrogen tank 71 in the rear body 50 may be coupled to the rear floor structure 53 and the partition panel 55.

Accordingly, the vehicle body structure 100 according to an embodiment of the present invention may secure the mounting rigidity of the second cooling module 65 and the at least one hydrogen tank 71 while simultaneously strengthening the vehicle body connectivity thereof by using the part mounting unit 59, and secure the vehicle body rigidity of the rear body 50.

While the present invention has been described in connection with the embodiments, it is to be understood that the present invention is not limited to the disclosed embodiments. On the contrary, it is intended to cover various modifications and equivalent arrangements included within the spirit and scope of the appended claims.

What is claimed is:

1. A vehicle body structure comprising:
   a front body comprising a first cooling module, wherein the front body includes a front side member on each of two sides of the front body in a vehicle width direction, the front side member being disposed in a vehicle body front-rear direction and the first cooling module being on a front portion of the front side member;
   a middle body having a center floor panel, the center floor panel being connected to the front body; and
   a rear body comprising a second cooling module and a third cooling module, the second cooling module being on each of two sides of a rear portion of the rear body in the vehicle width direction, the rear body being connected to the middle body, the third cooling module being in the rear portion of the rear body.

2. The vehicle body structure of claim 1, further comprising a fuel cell stack disposed between both the front side members.

3. The vehicle body structure of claim 1, wherein
   the middle body includes a middle side member on each of two sides of the middle body in the vehicle width direction, the middle side member being disposed in a vehicle front-rear direction, and
   the center floor panel is coupled to the middle side member, and a tunnel portion is on the center floor panel in the vehicle front-rear direction.

4. The vehicle body structure of claim 3, wherein the rear body includes:
   a rear side member on each of two sides of the rear body in the vehicle width direction, the rear side member being disposed in the vehicle front-rear direction,
   a dome-shaped rear floor structure coupled to the front portion of the rear side member and connected to the center floor panel, and
   a rear cross member coupled to the rear side member at the rear of the dome-shaped rear floor structure.

5. The vehicle body structure of claim 4, wherein a partition panel is coupled to an upper portion of the dome-shaped rear floor structure to partition the middle body and the rear body from each other.

6. The vehicle body structure of claim 5, wherein the second cooling module is on each of two sides of the dome-shaped rear floor structure in the vehicle width direction.

7. The vehicle body structure of claim 5, wherein
   the partition panel includes a bent portion bent toward the middle body from each of two sides of the rear body in the vehicle width direction, and an air flow passage is disposed between the bent portion and a side structure, the side structure being on each of two sides of the rear body in the vehicle width direction.

8. The vehicle body structure of claim 7, wherein
the second cooling module is in the air flow passage, and
air inlet holes connected to the air flow passage are respectively in a first rear side panel and a second rear side panel of the side structure.

9. The vehicle body structure of claim 5, wherein the third cooling module is below the rear side member at the rear of the dome-shaped rear floor structure.

10. The vehicle body structure of claim 5, further comprising:
at least one hydrogen tank between the partition panel and the rear cross member, and
a driving motor and an inverter below the at least one hydrogen tank.

11. The vehicle body structure of claim 5, wherein the rear body further includes:
a part mounting unit coupled to the dome-shaped rear floor structure and the partition panel; and
at least one hydrogen tank and the second cooling module in the rear body.

12. The vehicle body structure of claim 11, wherein the part mounting unit includes:
a lower mounting cross member coupled to the upper portion of the dome-shaped rear floor structure in the vehicle width direction and a lower portion of the partition panel, and
an upper mounting cross member coupled to an upper portion of the partition panel in the vehicle width direction.

13. The vehicle body structure of claim 4, further comprising:
a high-voltage battery under the dome-shaped rear floor structure and under the tunnel portion on the center floor panel in the vehicle front-rear direction.

14. The vehicle body structure of claim 13, wherein the high-voltage battery has a 'T' shape and is under the dome-shaped rear floor structure and the tunnel portion.

15. A vehicle body structure comprising:
a front body comprising a first cooling module;
a middle body having a center floor panel, the center floor panel being connected to the front body; and
a rear body comprising a second cooling module and a third cooling module, the second cooling module being on each of two sides of a rear portion of the rear body in a vehicle width direction, the rear body being connected to the middle body, the third cooling module being in the rear portion of the rear body;
a hydrogen charging port in a first rear side panel of a side structure on each of two sides of the rear body in the vehicle width direction; and
an electric charging port in a second rear side panel of the side structure.

16. A vehicle body structure comprising:
a front body comprising a first cooling module, a fuel cell stack, and front side members, the front side members being on each of two sides of the front body in a vehicle width direction, the front side member extending in a vehicle body front-rear direction, the vehicle body front-rear direction being perpendicular to the vehicle width direction, the first cooling module being on a front portion of the front side member, the fuel cell stack being between the front side members;
a middle body having a center floor panel, middle side members, and a tunnel portion, the middle side members being on each of two sides of the middle body in the vehicle width direction, the middle side members extending in a vehicle front-rear direction and being connected to the front side members, the center floor panel being coupled to the middle side members, the tunnel portion being on the center floor panel in the vehicle front-rear direction, the center floor panel being connected to the front body; and
a rear body comprising a second cooling module, a third cooling module, and rear side members, the rear side members being on each of two sides of the rear body in the vehicle width direction, the rear side member extending in the vehicle front-rear direction and being connected to the middle side members, the second cooling module being on each of two sides of a rear portion of the rear body in the vehicle width direction, the rear body being connected to the middle body, the third cooling module being in the rear portion of the rear body.

17. The vehicle body structure of claim 16, wherein the rear body further comprises:
a dome-shaped rear floor structure coupled to front portions of the rear side members and connected to the center floor panel, and
a rear cross member coupled to the rear side members at the rear of the dome-shaped rear floor structure.

18. The vehicle body structure of claim 17, wherein a partition panel is coupled to an upper portion of the dome-shaped rear floor structure.

19. The vehicle body structure of claim 17, further comprising:
a high-voltage battery under the dome-shaped rear floor structure and under the tunnel portion on the center floor panel in the vehicle front-rear direction.

20. The vehicle body structure of claim 19, wherein the high-voltage battery has a 'T' shape and is under the dome-shaped rear floor structure and the tunnel portion.

* * * * *